(12) United States Patent
Takeyama et al.

(10) Patent No.: US 10,632,617 B2
(45) Date of Patent: Apr. 28, 2020

(54) ATTACHMENT APPARATUS, ATTACHMENT METHOD, AND HAND MECHANISM

(71) Applicant: SONY CORPORATION, Tokyo (JP)

(72) Inventors: Shinichi Takeyama, Chiba (JP); Takayuki Furubo, Chiba (JP); Hirokuni Beppu, Chiba (JP)

(73) Assignee: SONY CORPORATION, Tokyo (JP)

( * ) Notice: Subject to any disclaimer, the term of this patent is extended or adjusted under 35 U.S.C. 154(b) by 110 days.

(21) Appl. No.: 15/756,150

(22) PCT Filed: Jun. 7, 2016

(86) PCT No.: PCT/JP2016/002752
§ 371 (c)(1),
(2) Date: Feb. 28, 2018

(87) PCT Pub. No.: WO2017/046975
PCT Pub. Date: Mar. 23, 2017

(65) Prior Publication Data
US 2018/0243907 A1    Aug. 30, 2018

(30) Foreign Application Priority Data
Sep. 18, 2015 (JP) ................. 2015-184831

(51) Int. Cl.
*B25J 9/16* (2006.01)
*B25J 13/08* (2006.01)
(Continued)

(52) U.S. Cl.
CPC ............. *B25J 9/1612* (2013.01); *B23P 19/04* (2013.01); *B23P 21/00* (2013.01); *B25J 13/082* (2013.01);
(Continued)

(58) Field of Classification Search
CPC .... B25J 9/1612; B25J 13/082; B25J 15/0061; B25J 19/023; B25J 15/08
(Continued)

(56) References Cited

U.S. PATENT DOCUMENTS 4,626,013 A * 12/1986 Barrows ............... B25J 15/0052
294/103.1
4,667,997 A * 5/1987 Udagawa ............... B25J 13/082
294/86.4
(Continued)

FOREIGN PATENT DOCUMENTS

CN      101842195 A     9/2010
CN      203367643 U     12/2013
(Continued)

OTHER PUBLICATIONS

International Search Report and Written Opinion of PCT Application No. PCT/JP2016/002752, dated Sep. 13, 2016, 12 pages.
(Continued)

*Primary Examiner* — Paul T Chin
(74) *Attorney, Agent, or Firm* — Chip Law Group

(57) ABSTRACT

An attachment apparatus according to an embodiment of the present technology includes a hand portion and a control unit. The hand portion includes a restriction portion that restricts a movement of a flat cable in a width direction and a holding portion that holds at least one of both surfaces of the flat cable. The control unit causes the flat cable to be held by a first holding force while restricting the movement in the width direction at a first position on the flat cable, causes the hand portion to move to a second position on the flat cable while maintaining the first holding force, and causes the flat cable to be held at the second position by a second holding force to attach the flat cable.

18 Claims, 13 Drawing Sheets

(51) Int. Cl.
*B25J 15/08* (2006.01)
*B25J 19/02* (2006.01)
*B23P 19/04* (2006.01)
*B25J 15/10* (2006.01)
*B25J 15/02* (2006.01)
*B23P 21/00* (2006.01)

(52) U.S. Cl.
CPC ........... *B25J 15/0253* (2013.01); *B25J 15/08* (2013.01); *B25J 15/103* (2013.01); *B25J 19/023* (2013.01)

(58) Field of Classification Search
USPC ...................................... 294/86.4, 119.1, 213
See application file for complete search history.

(56) References Cited

U.S. PATENT DOCUMENTS

| | | | | | |
|---|---|---|---|---|---|
| 4,693,505 | A | * | 9/1987 | DiMeo | F16D 3/74 294/119.1 |
| 4,696,501 | A | * | 9/1987 | Webb | B25J 13/082 294/103.1 |
| 4,766,322 | A | * | 8/1988 | Hashimoto | B25J 9/1015 250/559.33 |
| 4,830,420 | A | * | 5/1989 | van de Ven | B25J 13/081 294/86.4 |
| 4,861,087 | A | * | 8/1989 | Park | B25J 15/0253 294/119.1 |
| 5,176,492 | A | | 1/1993 | Nakamura | |
| 2004/0183320 | A1 | | 9/2004 | Evans et al. | |
| 2006/0012198 | A1 | * | 1/2006 | Hager | B25J 9/1612 294/106 |
| 2010/0256818 | A1 | | 10/2010 | Aoba et al. | |
| 2016/0221188 | A1 | * | 8/2016 | Nagai | B25J 9/1612 |
| 2019/0202070 | A1 | * | 7/2019 | Nakagawa | B25J 9/1612 |

FOREIGN PATENT DOCUMENTS

| | | |
|---|---|---|
| CN | 104335425 A | 2/2015 |
| EP | 2225073 A2 | 9/2010 |
| JP | 03-221392 A | 9/1991 |
| JP | 07-299678 A | 11/1995 |
| JP | 2009-107043 A | 5/2009 |
| KR | 10-1994-0003684 B1 | 4/1994 |
| WO | 2009/057416 A2 | 5/2009 |

OTHER PUBLICATIONS

Office Action for CN Patent Application No. 201680052480.3, dated Sep. 11, 2019, 07 pages of Office Action and 06 pages of English Translation.

* cited by examiner

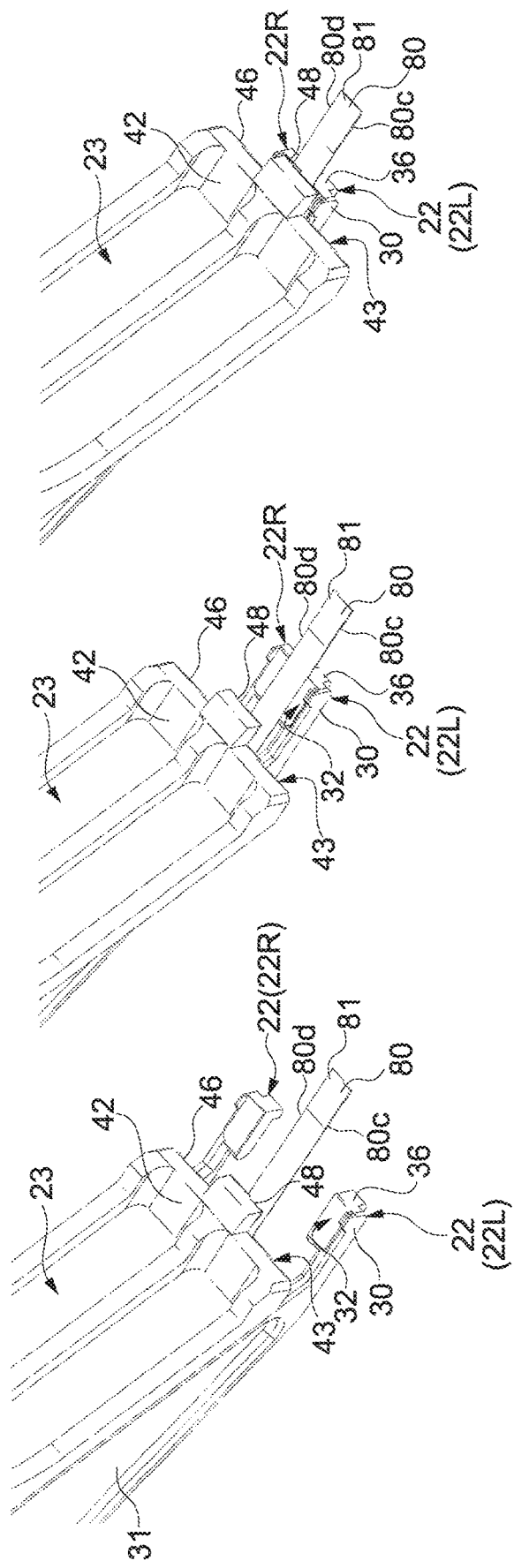

ATTACHMENT APPARATUS, ATTACHMENT METHOD, AND HAND MECHANISM

CROSS REFERENCE TO RELATED APPLICATIONS

This application is a U.S. National Phase of International Patent Application No. PCT/JP2016/002752 filed on Jun. 7, 2016, which claims priority benefit of Japanese Patent Application No. JP 2015-184831 filed in the Japan Patent Office on Sep. 18, 2015. Each of the above-referenced applications is hereby incorporated herein by reference in its entirety.

TECHNICAL FIELD

The present technology relates to an attachment apparatus, an attachment method, and a hand mechanism used for assembling an electronic apparatus, for example, and the like.

BACKGROUND ART

Robot apparatuses that attach cables for assembling or the like in manufacturing lines of electronic apparatuses and electronic components, and the like are known. For example, in a robot apparatus described in Patent Literature 1, in a state where a cable is gripped by a grip portion provided at a tip end of an arm, the grip portion is slid in a predetermined trajectory. This predetermined trajectory is set as appropriate so that a connector is guided to a guide area.

When a contact state between the grip portion and the connector is detected by a force sensor provided in the grip portion, a posture of the connector is detected on the basis of a photographed image obtained by a camera. The robot apparatus grips the connector on the basis of the detected posture of the connector and executes a cable attachment task. Accordingly, cables are to be attached efficiently (paragraphs [0030] to [0032] in specification of Patent Literature 1).

CITATION LIST

Patent Literature

Patent Literature 1: Japanese Patent Application Laid-open No. 2014-176917

DISCLOSURE OF INVENTION

Technical Problem

It is important to attach cables efficiently as described above, and in particular, a technology for automatically and accurately attaching flat cables is required.

In view of the circumstances as described above, the present technology aims at providing a attachment apparatus, an attachment method, and a hand mechanism with which flat cables can automatically and accurately be attached.

Solution to Problem

To attain the object described above, an attachment apparatus according to an embodiment of the present technology includes a hand portion and a control unit.

The hand portion includes a restriction portion that restricts a movement of a flat cable in a width direction and a holding portion that holds at least one of both surfaces of the flat cable.

The control unit causes the flat cable to be held by a first holding force while restricting the movement in the width direction at a first position on the flat cable, causes the hand portion to move to a second position on the flat cable while maintaining the first holding force, and causes the flat cable to be held at the second position by a second holding force to attach the flat cable.

In this attachment apparatus, the flat cable is held while the movement thereof in the width direction is restricted at the first position. Then, the hand portion is slid in that state to the second position, and the attachment is performed in a state where the second holding force is exerted. Accordingly, the flat cable can be automatically and accurately attached.

The second holding force may be larger than the first holding force.

Accordingly, the flat cable can be attached accurately.

The restriction portion may include a pair of fingers that nips the flat cable in the width direction. In this case, the holding portion may include a first surface portion that is provided at a tip end portion of each of the pair of fingers and holds one of the surfaces of the flat cable, and a holding finger including a second surface portion that holds the other one of the surfaces of the flat cable at a position opposing the first surface portion.

Accordingly, since both side portions and both surfaces of the flat cable are held, it becomes possible to stably hold the flat cable and thus improve attachment accuracy.

The restriction portion may include a first movement mechanism that moves at least one of the pair of fingers in the width direction. In this case, the holding portion may include a second movement mechanism that moves the holding finger in a direction in which the second surface portion comes into contact with the first surface portion.

It becomes possible to easily hold both side portions of the flat cable by the first movement mechanism. In addition, it becomes possible to attach a plurality of types of flat cables having different widths in accordance with each of the widths. Further, both surfaces of the flat cable can be easily held by the second movement mechanism.

The control unit may cause each of the pair of fingers to move toward the flat cable such that the first surface portion opposes the one of the surfaces of the flat cable, and cause the holding finger to move such that the flat cable is sandwiched by the first surface portion and the second surface portion.

Accordingly, both side portions and both surfaces of the flat cable can be held easily.

The control unit may set a distance between the first surface portion and the second surface portion at the first position as a first distance, and set a distance between the first surface portion and the second surface portion at the second position as a second distance smaller than the first distance.

Accordingly, the holding force can be switched easily.

The second surface portion may include a reference surface, a concave portion formed on the reference surface, a first contact member that protrudes from the reference surface in the concave portion and is movable in the protrusion direction, and an elastic member that supports the first contact member in the concave portion. In this case, the control unit may cause the first contact member that protrudes from the reference surface at the first position to come into contact with the other one of the surfaces of the flat cable.

By appropriately selecting the types of first contact member and elastic member, a desired holding force can be exerted.

The second surface portion may include a second contact member provided on the reference surface. In this case, the control unit may cause the second contact member to come into contact with the other one of the surfaces by causing the holding finger to move such that the first contact member that is in contact with the other one of the surfaces is accommodated in the concave portion at the second position.

Accordingly, it becomes possible to easily switch the member to come into contact with the flat cable. Further, by appropriately selecting the second contact member, a desired holding force can be exerted.

The first contact member may be formed of polycarbonate. In this case, the elastic member may be formed of urethane foam, and the second contact member may be formed of chloroprene rubber.

Accordingly, the first and second holding forces can be exerted appropriately.

At least one of the pair of fingers may include a lock switch portion that switches a lock mechanism of a connector portion to which the flat cable is to be attached between a locked state and an unlocked state.

Accordingly, the flat cable can be automatically attached to the connector portion including the lock mechanism.

The lock mechanism may include a lever portion that is movable in a direction in which the flat cable is inserted into the connector portion and makes a switch between the locked state and the unlocked state when a position thereof in the insertion direction is switched. In this case, the lock switch portion may include a protrusion portion and a pressing portion. Further, the control unit may set the unlocked state by moving the lever portion in a direction opposite to the insertion direction of the flat cable by the protrusion portion, and set the locked state by moving the movement portion in the insertion direction of the flat cable by the pressing portion in a state where holding of the flat cable inserted into the connector portion is released.

Accordingly, the lock mechanism can be easily switched between the locked state and the unlocked state.

The attachment apparatus may further include an image pickup apparatus that photographs the flat cable held by the holding portion at the second position.

Accordingly, it becomes possible to recognize the holding state on the basis of a photographed image and thus improve attachment accuracy.

Each of the pair of fingers may include a base portion provided along a movement direction of the holding finger and the tip end portion that is coupled to the base portion and extends in a direction different from the movement direction of the holding finger. In this case, the control unit may cause the flat cable to be sandwiched by the base portions in a state where an extension direction of the tip end portion is substantially the same as an extension direction of the flat cable.

By providing the base portion obliquely (including vertically) with respect to the tip end portion, it becomes possible to easily nip the flat cable. In addition, when moving the hand portion from the first position to the second position, it becomes easy to give pre-tension to the flat cable.

The base portion may include a tilted portion that extends along the movement direction of the holding finger. In this case, the tip end portion may extend in a direction in which the first surface portion approaches the tilted portion.

Accordingly, it becomes possible to easily nip the flat cable while the first surface portion opposes one of the surfaces of the flat cable.

An angle formed between a virtual line that extends from a coupling portion between the tip end portion and the base portion along the extension direction of the tip end portion toward a side opposite to the tip end portion and the tilted portion may be 30 degrees or more and 80 degrees or less.

Accordingly, for example, it becomes possible to attach the flat cable to the connector portion provided in a narrow space.

The holding portion may include a suction portion that sucks at least one of the surfaces of the flat cable.

By holding the flat cable by adsorption, the apparatus can be miniaturized.

An attachment method according to an embodiment of the present technology includes holding, by a hand portion, the flat cable by a first holding force while restricting a movement in a width direction at a first position on the flat cable.

The hand portion is caused to move to a second position on the flat cable while maintaining the first holding force.

The flat cable is caused to be held at the second position by a second holding force, and the flat cable is attached to a connector portion.

By this attachment method, it becomes possible to automatically and accurately attach the flat cable.

A hand mechanism according to an embodiment of the present technology includes a restriction portion and a holding portion.

The restriction portion restricts a movement of a flat cable in a width direction.

The holding portion holds at least one of both surfaces of the flat cable.

By using this hand mechanism, it becomes possible to execute the attachment method described above and automatically and accurately attach the flat cable.

The restriction portion may include a pair of fingers that nips the flat cable in the width direction and a first movement mechanism that moves at least one of the pair of fingers in the width direction. In this case, the holding portion may include a first surface portion that is provided at a tip end portion of each of the pair of fingers and holds one of the surfaces of the flat cable, a holding finger including a second surface portion that holds the other one of the surfaces of the flat cable at a position opposing the first surface portion, and a second movement mechanism that moves the holding finger in a direction in which the second surface portion comes into contact with the first surface portion.

Advantageous Effects of Invention

As described above, according to the present technology, it becomes possible to automatically and accurately attach the flat cable. It should be noted that the effects described herein are not necessarily limited, and any effect described in the present disclosure may be obtained.

BRIEF DESCRIPTION OF DRAWINGS

FIGS. 9A, 9B, and 9C Perspective views showing an example of an FFC holding operation in an operation order.

MODES FOR CARRYING OUT THE INVENTION

Hereinafter, an embodiment of the present technology will be described with reference to the drawings.

[Configuration of Attachment Apparatus]

Figure 1:
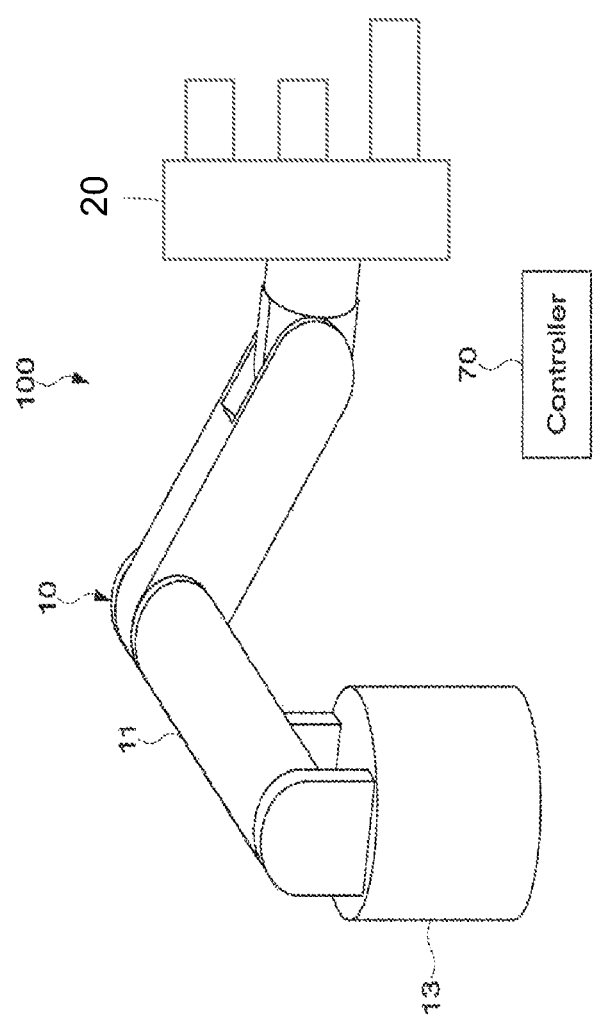
FIG. 1 A schematic diagram showing a configuration example of an attachment apparatus according to an embodiment of the present technology.

FIG. 1 is a schematic diagram showing a configuration example of an attachment apparatus according to an embodiment of the present technology. An attachment apparatus 100 is configured as an industrial robot used in a component assembly process in manufacturing lines of electronic apparatuses, for example. Of course, the attachment apparatus according to the present technology may also be used in other fields and processes.

The attachment apparatus 100 includes a robot body 10 and a controller 70. The robot body 10 includes a multi-joint arm 11, a hand portion (hand mechanism) 20 connected to a tip end portion of the multi-joint arm 11, and a drive unit 13 connected to a base end portion of the multi-joint arm 11.

The multi-joint arm 11 is constituted of, for example, a vertical multi-joint arm, but the multi-joint arm 11 is not limited to this and may be constituted of other types of multi-joint arms such as a horizontal multi-joint type, a SCARA (Selective Compliance Assembly Robot Arm) type, a frog leg type, and a parallel link type.

The drive unit 13 drives the multi-joint arm 11 and the hand portion 20 on the basis of a control command transmitted from the controller 70. Expansion and contraction of the multi-joint arm 11, swirls about a vertical axis (Z axis), rotations of the hand portion 20, and the like are executed by the drive unit 13.

The controller 70 collectively controls operations of the robot body 10. In this embodiment, the controller 70 controls an attachment operation of an FFC (Flexible Flat Cable) by the hand portion 20. The controller 70 is typically constituted of a computer and executes respective processing in accordance with programs stored in a memory. In this embodiment, the controller 70 functions as a control unit.

Figure 2:
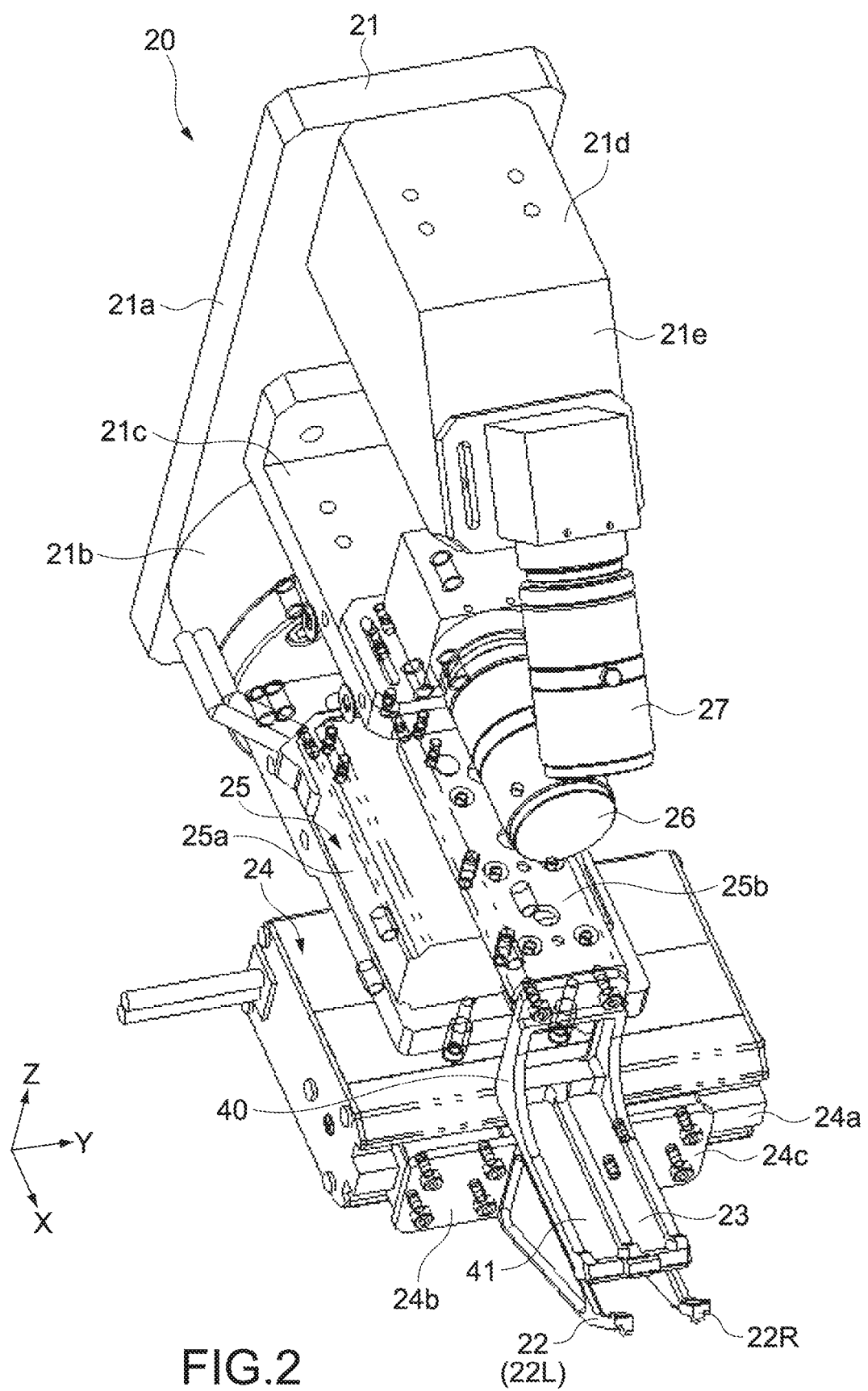
FIG. 2 A perspective view showing a specific configuration example of a hand portion.
Figure 3:
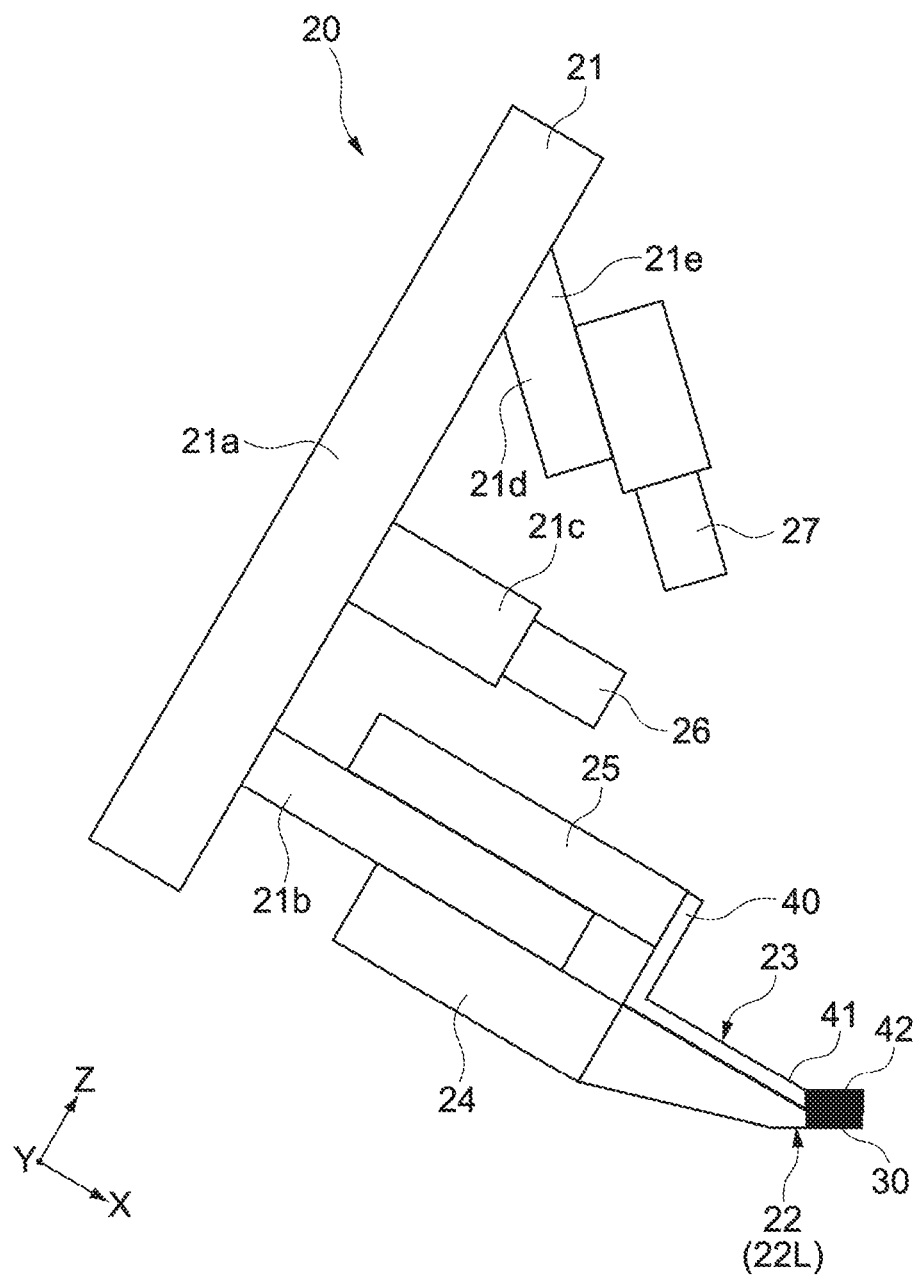
FIG. 3 A side view schematically showing the hand portion shown in FIG. 2.

FIG. 2 is a perspective view showing a specific configuration example of the hand portion 20. FIG. 3 is a side view schematically showing the hand portion 20 shown in FIG. 2.

The hand portion 20 includes a base portion 21, a pair of fingers 22, a center finger (hereinafter, referred to as C finger) 23, a hand actuator 24, a slide actuator 25, a first camera 26, and a second camera 27.

The base portion 21 includes a main body portion 21a connected to the multi-joint arm 11, a finger support portion 21b provided on the main body portion 21a, and camera support portions 21c and 21d. The main body portion 21a is a substantially plate-like member and has a substantially rectangular shape when viewed from the front. The multi-joint arm 11 is connected to a back side of the base portion 21, and the finger support portion 21b and the camera support portions 21c and 21d are provided on a front side of the main body portion 21a.

For the sake of convenience, it is assumed that a longitudinal direction of the main body portion 21a is a Z-axis direction, and a short-side direction of the main body portion 21a is a Y-axis direction. Further, a direction orthogonal to each of the longitudinal direction and the short-side direction, that is, a direction vertical to a surface to which the finger support portion 21b and the like are connected is assumed to be an X-axis direction. In addition, it is assumed that a side pointed by an arrow of the Z axis is an upper side, and an opposite side is a lower side. It should be noted that a posture of the hand portion 20 can be arbitrarily changed by the multi-joint arm 11.

The finger support portion 21b is provided at an end portion on the lower side of the main body portion 21a while extending in the X-axis direction of the main body portion 21a. The camera support portion 21c is provided at a center portion of the main body portion 21a while extending in the X-axis direction (not shown in FIG. 3). The camera support portion 21d is provided at an end portion on the upper side of the main body portion 21a and includes a setting surface 21e tilted with respect to the Z-axis direction.

The base portion 21 is formed of a metal material such as aluminum, for example, but is not limited thereto. Further, the shape of the base portion 21 is not limited, and the shape may be designed as appropriate so as to enable the connection to the multi-joint arm 11 and attachments of the respective actuators and the like.

The first camera 26 is installed in the camera support portion 21c such that a photographing optical axis becomes substantially parallel to the X-axis direction. The second camera 27 is installed on the setting surface 21e of the camera support portion 21d such that a photographing optical axis faces tip end portions of the pair of fingers 22 and the C finger 23. As the first and second cameras 26 and 27, for example, a CCD camera, a CMOS camera, and the like are used.

The hand actuator 24 is connected to a lower-side surface of the finger support portion 21b. The hand actuator 24 includes a drive mechanism (not shown), a guide 24a extending along the Y-axis direction, and two sliders 24b and 24c that move in the Y-axis direction along the guide 24a (not shown in FIG. 3).

A left finger (hereinafter, referred to as L finger) 22L out of the pair of fingers 22 is connected to the slider 24b. A right finger (hereinafter, referred to as R finger) 22R is connected to the slider 24C. By operating the hand actuator 24, each of the L and R fingers 22L and 22R can move along the Y-axis direction.

In this embodiment, using an intermediate point between the L and R fingers 22L and 22R as a reference, both fingers are moved only the same distance in opposite directions. In other words, the respective fingers are moved only the same distance in directions in which the fingers approach or move away from the intermediate point. The present technology is not limited to this configuration, and one of the pair of fingers 22 may be fixed so that only the other one of the fingers becomes movable. In other words, at least one of the fingers only needs to be movable along the Y-axis direction.

A configuration of the drive mechanism in the hand actuator 24 is not limited, and a drive source such as a motor, a ball screw mechanism, a gear mechanism, or the like is used, for example. In addition, an arbitrary mechanism such as a belt mechanism and a cylinder mechanism may be used. The hand actuator 24 functions as a first movement mechanism in this embodiment.

The slide actuator 25 is connected to an upper-side surface of the finger support portion 21b. The slider actuator 25 includes a drive mechanism (not shown), a guide body portion 25a, and a slider 25b movable along the X-axis direction with respect to the guide body portion 25a (not shown in FIG. 3).

The C finger 23 is connected to the slider 25b. By operating the slide actuator 25, the C finger 23 becomes movable along the X-axis direction. A configuration of the drive mechanism is not limited, and an arbitrary mechanism may be used as appropriate. In this embodiment, the slide actuator 25 functions as a second movement mechanism.

Figure 4:
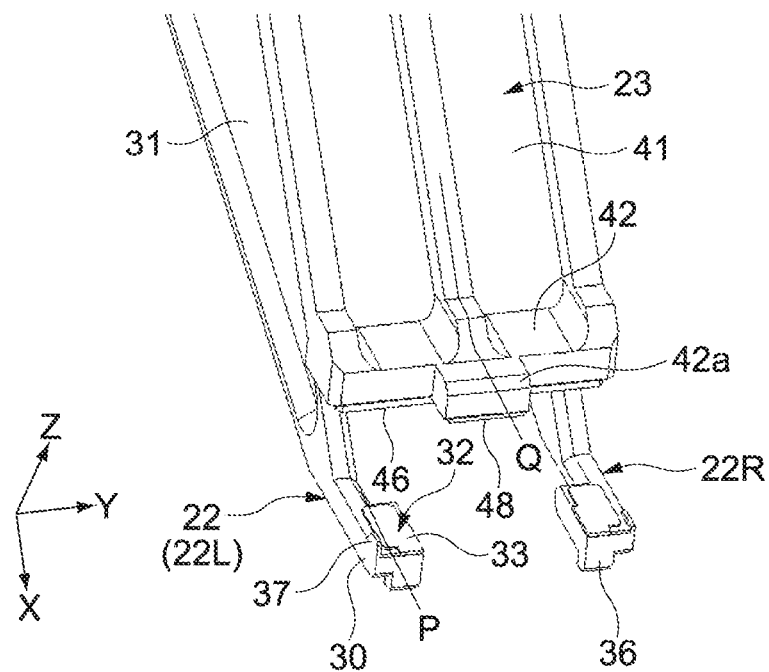
FIG. 4 An enlarged perspective view of a tip end portion of an L finger, an R finger, and a C finger.
Figure 5:
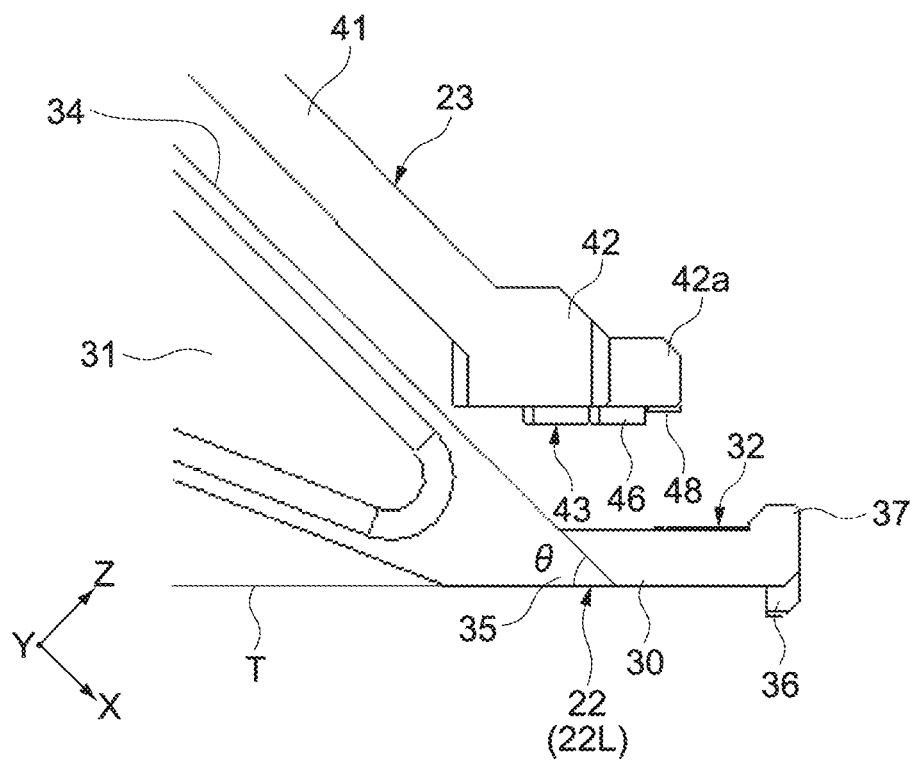
FIG. 5 An enlarged side view of the tip end portion of the L finger, the R finger, and the C finger.
Figure 6:
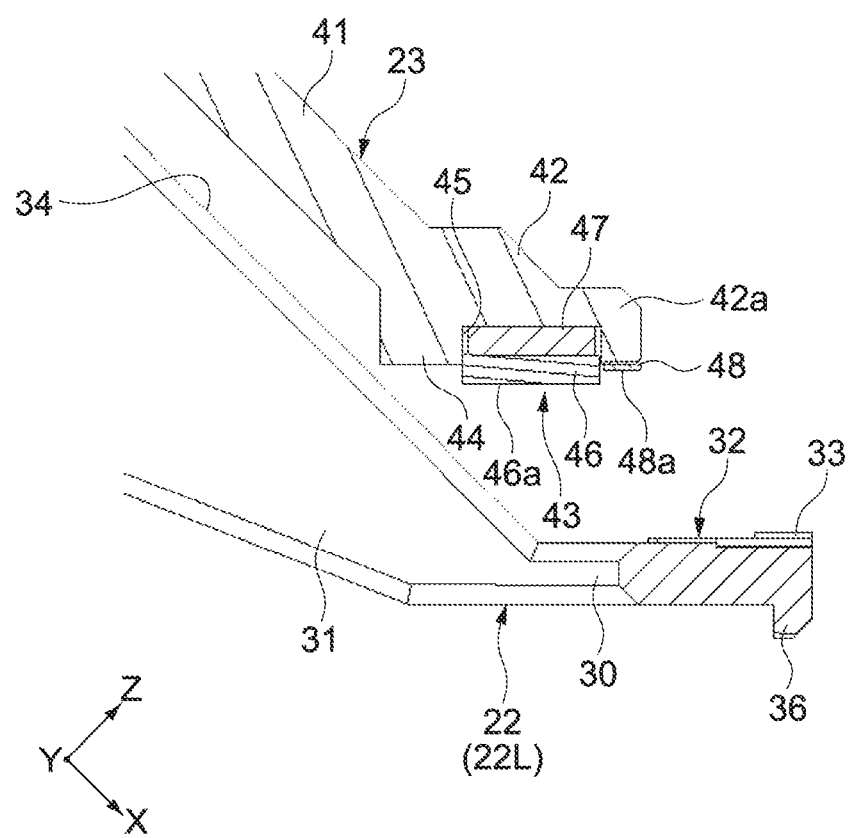
FIG. 6 An enlarged partial cross-sectional diagram of the tip end portion of the L finger, the R finger, and the C finger.

FIGS. 4 to 6 are enlarged diagrams showing the tip end portions of the L finger 22L, the R finger 22R, and the C finger 23. FIG. 4 is a perspective view, and FIG. 5 is a side view. FIG. 6 is a partial cross-sectional diagram showing a cross section of the tip end portion of the L finger 22L and a cross section of the tip end portion of the C finger 23. The cross sections correspond to cross sections taken along the lines P and Q shown in FIG. 3, respectively.

The L and R fingers 22L and 22R have substantially the same configuration. Accordingly, the configuration of each finger will be described while simply referring to each finger as finger 22.

The finger 22 includes a tip end portion 30 and a base portion 31 coupled to the tip end portion 30. The tip end portion 30 mainly includes a function of holding a lower surface of an FFC. The base portion 31 mainly includes a function of holding a side portion of the FFC.

A first surface portion 32 that holds the lower surface of the FFC is formed on an upper-side surface of the tip end portion 30. A contact member 33 that comes into contact with the lower surface of the FFC is set on the first surface portion 32. Polycarbonate or the like is used as the contact member 33, for example, but is not limited thereto. The first surface portion 32 includes a width of about 2 to 3 times a width of the finger 22. Accordingly, the lower surface of the FFC can be held stably.

As shown in FIG. 5, the base portion 31 is provided along the X-axis direction as a movement direction of the C finger 23. Side surfaces of the base portion 31 have a substantially triangular shape, and an upper side 34 thereof is aligned in the X-axis direction. By forming the base portion 31 so as to include a certain amount of area when viewed from the side surfaces, the side portions of the FFC can be held stably. It should be noted that the upper side 34 corresponds to a tilted portion in this embodiment.

The tip end portion 30 extends in a direction different from the X-axis direction, specifically, in a direction in which the first surface portion 32 approaches the upper side 34. Specifically, an angle formed between the first surface portion 32 and the upper side 34 is set to be 180 degrees or less. As a result, it becomes possible to sandwich the side portion of the FFC by the base portion 31 while the first surface portion 32 opposes the lower surface of the FFC (see FIG. 10A).

As shown in FIG. 5, a virtual line T extending from a coupling portion 35 between the tip end portion 30 and the base portion 31 in an extension direction of the tip end portion 30 toward a side opposite to the tip end portion 30 is created. An angle θ between the virtual line T and the upper side 34 of the base portion 31 is set within a range of, for example, 30 degrees or more and 80 degrees or less.

A protrusion portion 36 and a pressing portion 37 are provided at a further tip end portion of the tip end portion 30 of the finger 22. The protrusion portion 36 is provided on the lower-side surface of the tip end portion 30, that is, on a surface on the other side of the first surface portion 32, while protruding downward. The pressing portion 37 is provided so as to protrude upward from an outer edge portion of the first surface portion 32. The pressing portion 37 is formed at a position which does not hinder the holding of the FFC by the first surface portion 32. In this embodiment, the protrusion portion 36 and the pressing portion 37 function as a lock switch portion.

As shown in FIGS. 2 and 3, the C finger 23 includes an attachment portion 40 extending in the Z-axis direction and a finger portion 41 coupled to the attachment portion 40. The attachment portion 40 is connected to the slider 25b of the slide actuator 25. The finger portion 41 is a substantially plate-like member and is coupled to the attachment portion 40 in a direction in which a longitudinal direction thereof extends in the Z-axis direction. The C finger 23 functions as a holding finger in this embodiment.

A width of the finger portion 41 (size in Y-axis direction) is typically designed to be larger than a distance between the L and R fingers 22L and 22R sandwiching the FFC, though of course is not limited to this.

The tip end portion of the finger portion 41 becomes a tip end portion 42. The tip end portion 42 extends along the same direction as the tip end portion 30 of the finger 22. Further, a lower surface of the tip end portion 42 becomes a second surface portion 43 that holds an upper surface of the FFC. When the C finger 23 is slid forward along the Z-axis direction, the first surface portions 32 of the L and R fingers 22L and 22R and the second surface portion 43 of the C finger 23 face each other and eventually come into contact with each other. Specifically, the slide actuator 25 moves the C finger 23 in a direction in which the second surface portion 43 comes into contact with the first surface portion 32.

As shown in FIG. 4, a protrusion portion 42a protruding in an extension direction of the tip end portion 42 is formed at a center portion of the tip end portion 42 in the width direction (Y-axis direction).

As shown in the partial cross-sectional portion of FIG. 6, the second surface portion 43 includes a reference surface 44, a concave portion 45, a first contact member 46, an elastic member 47, and a second contact member 48. The reference surface 44 is a plane formed across substantially the entire area of the second surface portion 43 (also including protrusion portion 42a). The concave portion 45 is formed across substantially the entire area of the tip end portion 42 in the width direction (Y-axis direction).

The first contact member 46 protrudes from the reference surface 44 in the concave portion 45 and is movable in the protrusion direction. The elastic member 47 supports the first contact member 46 in the concave portion 45. Specifically, the elastic member 47 is set on a bottom surface (upper surface in figure) of the concave portion 45, and the first contact member 46 is connected to the elastic member 47.

As shown in FIG. 6, in a state where no force is applied to the second surface portion 43, a front surface 46a (lower surface) of the first contact member 46 protrudes more than the reference surface 44. When the first contact member 46 is pressed, the first contact member 46 is accommodated in the concave portion 45.

The second contact member 48 is formed on the reference surface 44 in the protrusion portion 42a of the tip end portion 42. Assuming that, using the reference surface 44 as a reference, a direction perpendicular to the reference surface 44 is a height direction, in a state where no force is applied to the second surface portion 43, the front surface 46a of the first contact member 46 becomes higher than a front surface 48a of the second contact member 48. On the other hand, in a state where the first contact member 46 is accommodated in the concave portion 45, the front surface 48a of the second contact member 48 becomes higher than the front surface 46a of the first contact member 46.

Materials and the like of the first contact member 46 and the elastic member 47 are selected as appropriate so that a desired holding force (first holding force) can be exerted in a slide mode in which the hand portion 20 is moved while sandwiching the FFC. Specifically, a material with which the hand portion 20 becomes movable and a holding force capable of applying an appropriate pre-tension to the FFC can be exerted is selected. In this embodiment, polycarbonate and urethane foam are respectively used as the first contact member 46 and the elastic member 47, but the materials are not limited thereto.

A materials and the like of the second contact member 48 are selected as appropriate so that a desired holding force (second holding force) can be exerted in an attachment mode in which the FFC is inserted into and attached to a connector portion. Specifically, a material with which a holding force larger than the first holding force can be exerted so as to enable the FFC to be held sufficiently without deviation during attachment is selected. In this embodiment, chloroprene rubber is used as the second contact member 48, but the material is not limited thereto.

The L and R fingers 22L and 22R and the C finger 23 are formed of, for example, a metal material, but are not limited thereto.

In this embodiment, the base portion 31 of the L and R fingers 22L and 22R functions as a restriction portion that restricts a movement of the FFC in the width direction. Further, the first surface portions 32 of the L and R fingers 22L and 22R and the C finger 23 including the second surface portion 43 function as a holding portion that holds at least one surface of the FFC in this embodiment.

[FFC Attachment Operation]

Figure 7B:
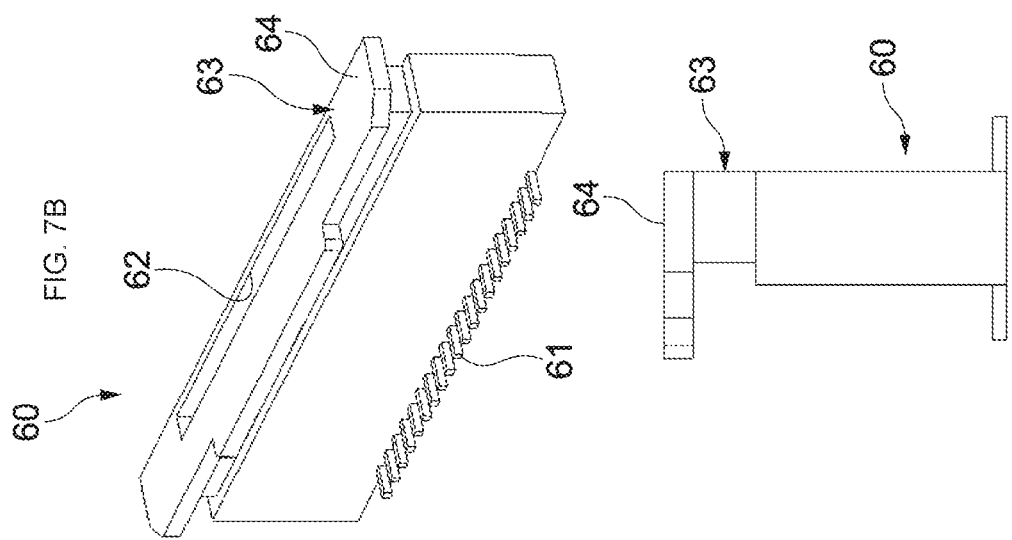
FIGS. 7A and 7B Perspective views each showing a configuration example of a connector portion to which an FFC is to be attached.
Figure 7A:
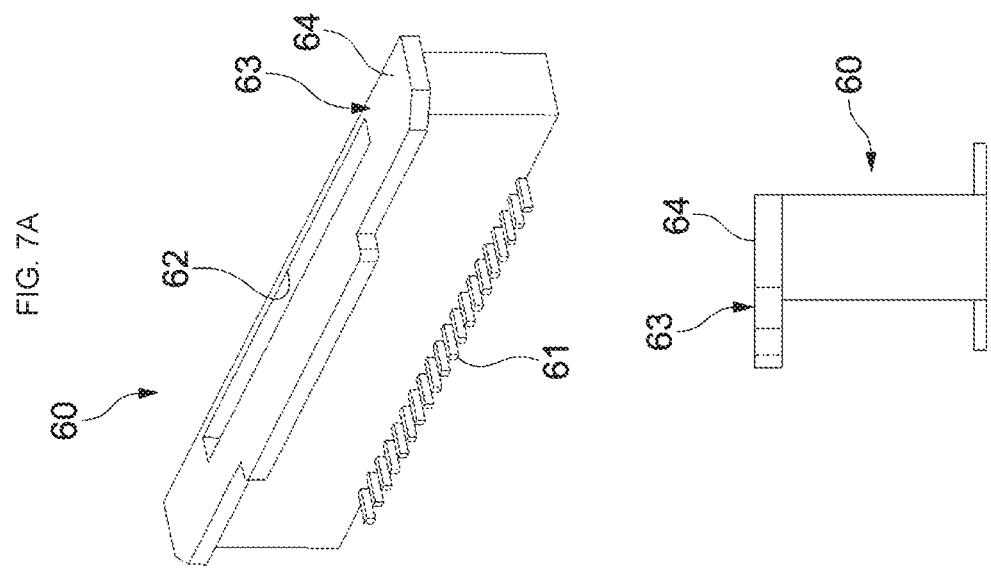

FIGS. 7A and 7B are perspective views each showing a configuration example of the connector portion to which the FFC is to be attached. In this embodiment, a case of attaching a 40-pin (40P) FFC will be described as an example. FIG. 7A is a diagram showing a case where a lock mechanism 63 of a connector portion 60 is in a locked state. FIG. 7B is a diagram showing a case where the lock mechanism 63 is in an unlocked state.

As shown in FIGS. 7A and 7B, the connector portion 60 includes a terminal portion 61, an insertion opening 62 into which the FFC is inserted, and a lever portion 64 that is a part of the lock mechanism 63 and is movable along an insertion direction of the FFC. When the lever portion 64 is moved in the insertion direction of the FFC, that is, pushed toward the connector portion 60, the lock mechanism 63 is put to the locked state. When the lever portion 64 is moved in a direction opposite to the insertion direction of the FFC, that is, pulled upward, the lock mechanism 63 is put to the unlocked state.

In the attachment apparatus 100 according to this embodiment, it is possible to attach the FFC to the connector portion 60 without limiting a direction in which the connector portion 60 is set. In other words, the insertion direction of the FFC can be set in an arbitrary direction. In descriptions below, for ease of explanation, it is assumed that the connector portion 60 is set while facing upward with respect to a horizontal plane. In addition, it is assumed that a reinforcement plate at a tip end of the FFC is inserted into the insertion opening 62 of the connector portion 60 from the upper side to the lower side with the vertical direction being the insertion direction.

Further, in attaching the FFC, in a state where one of the end portions of the FFC is fixed at a predetermined position, the reinforcement plate at the other end portion is inserted into the connector portion 60. Typically, one of the end portions of the FFC is already attached to a connector portion of a predetermined apparatus such as a drive apparatus. In a state where the drive apparatus or the like is incorporated at a predetermined position, the reinforcement plate at the other end portion is inserted into the target connector portion 60 by the attachment apparatus 100.

Of course, the present technology is not limited to this, and both ends of the FFC are fixed to a predetermined fixing mechanism, and one of the end portions is detached from the fixing mechanism and attached to a predetermined connector portion 60 by the attachment apparatus 100. After that, the other end portion is detached from the fixing mechanism and attached to another connector portion 60. Such control is also possible.

Figure 8:
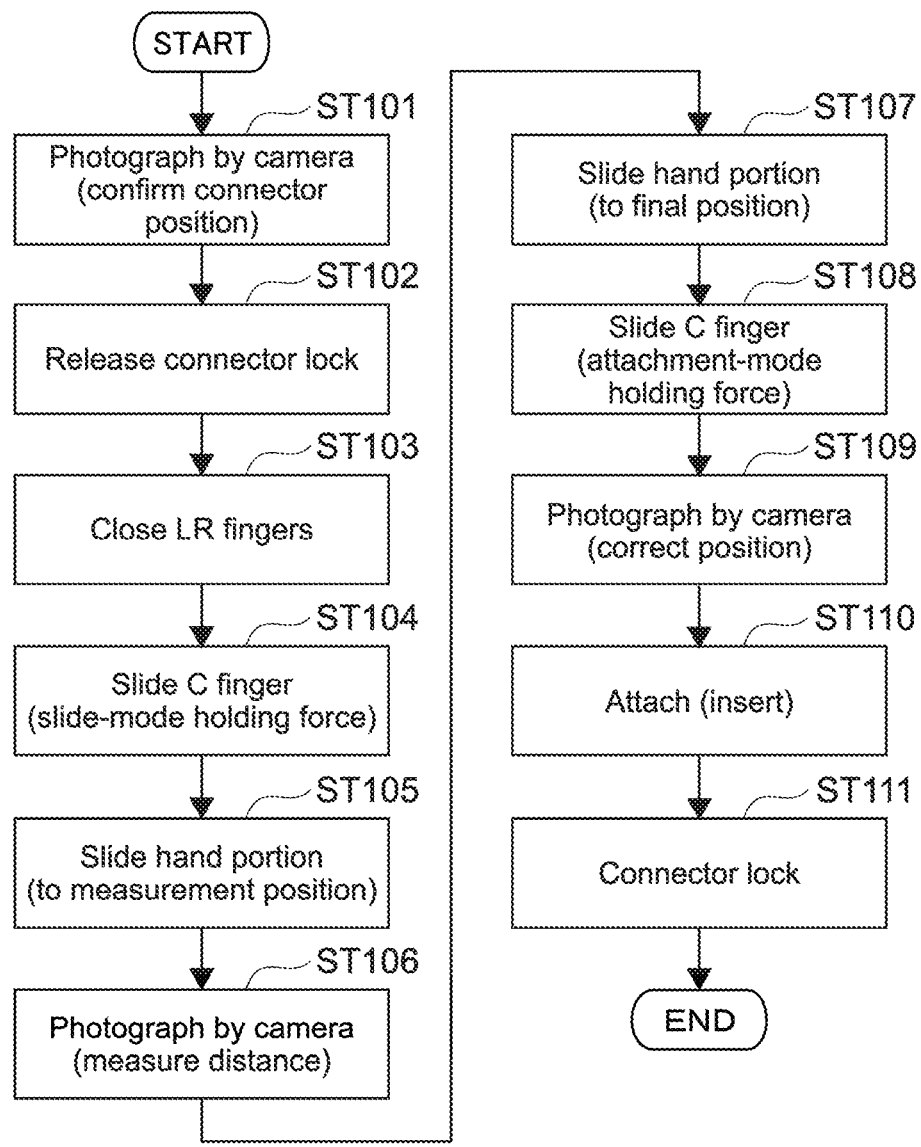
FIG. 8 A flowchart showing an example of an FFC attachment operation by the attachment apparatus.

FIG. 8 is a flowchart showing an example of the FFC attachment operation by the attachment apparatus 100. FIGS. 9A, 9B, 9C, 10A, 10B, and 10C are schematic diagrams showing an example of an FFC holding operation in an operation order. In FIGS. 9A, 9B, 9C, 10A, 10B, and 10C, an FFC (e.g., 6 pins, 9 pins, etc.) 80 having a width smaller than that of the 40-pin FFC is illustrated, but an operation principle is the same. In addition, in FIGS. 10A, 10B, and 10C, a portion sandwiched by the L and R fingers 22L and 22R is also illustrated so that it can be seen visually to help understand the operation.

First, the X-axis direction shown in FIGS. 1 and 2 is set in the vertical direction, and the connector portion 60 is photographed by the first camera 26 from above. As a result, the position of the connector section 60 can be checked (Step 101).

The connector lock is released, that is, the lock mechanism 61 of the connector portion 60 is released by the protrusion portions 36 of the L and R fingers 22L and 22R (Step 102).

Figure 11A:
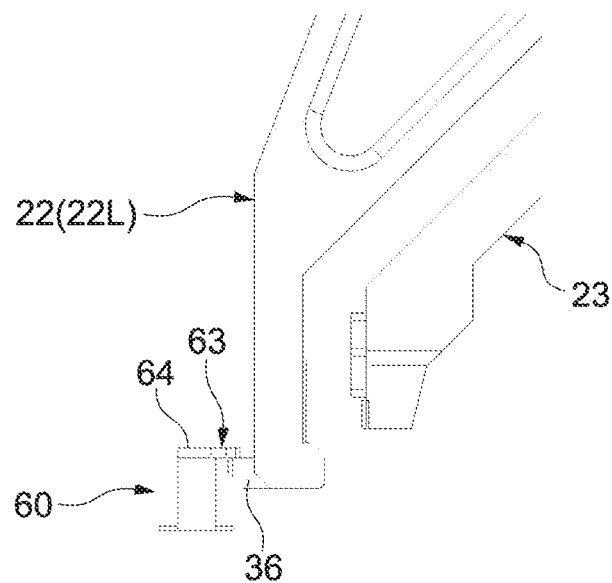
FIGS. 11A and 11B Schematic diagrams showing an operation example of releasing a connector lock.
Figure 11B:
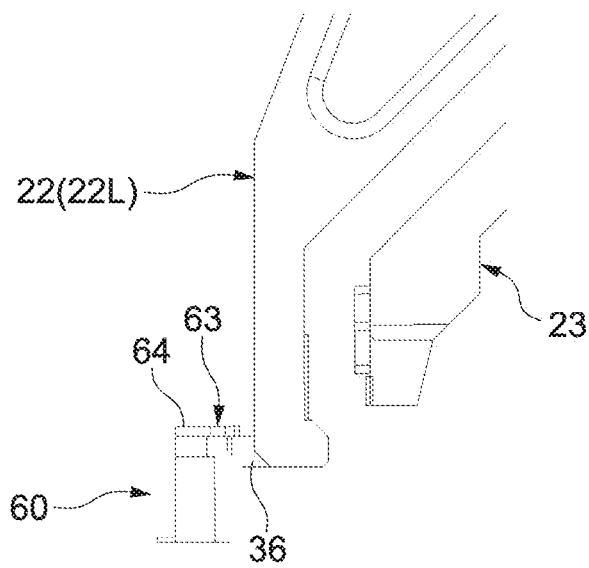

FIGS. 11A and 11B are schematic diagrams showing an operation example of releasing the connector lock. As shown in FIG. 11A, the protrusion portion 36 is engaged with the lever portion 64 of the lock mechanism 63. As shown in FIG. 11B, the lever portion 64 is lifted up in the vertical direction. As a result, the lock mechanism 63 is switched to the unlocked state.

Next, at a first position on the FFC 80, the FFC 80 is held by a first holding force that is a holding force in the slide mode, while a movement thereof in the width direction is restricted. Specifically, as shown in FIGS. 9A and 9B, the L and R fingers 22L and 22R are closed so that the first surface portions 32 oppose a lower surface 80a of the FFC 80, and both side portions 80c and 80d of the FFC 80 are held by the base portions 31 (Step 103). In other words, the FFC 80 is sandwiched by the base portions 31 in a state where the extension direction of the tip end portions 30 of the L and R fingers 22L and 22R becomes substantially equal to the extension direction of the FFC 80.

Figure 10A:
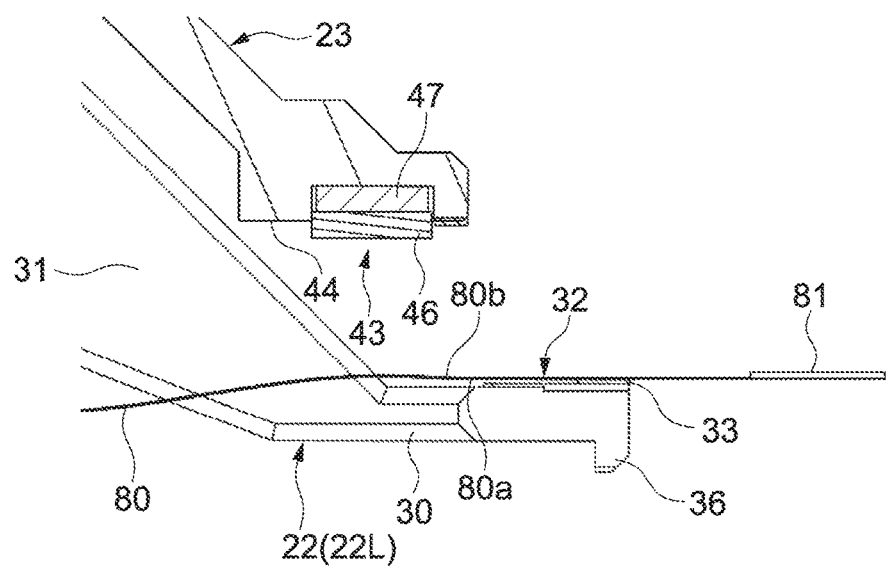
FIGS. 10A, 10B, and 10C Partial cross-sectional diagrams showing an example of the FFC holding operation in the operation order.
Figure 10B:
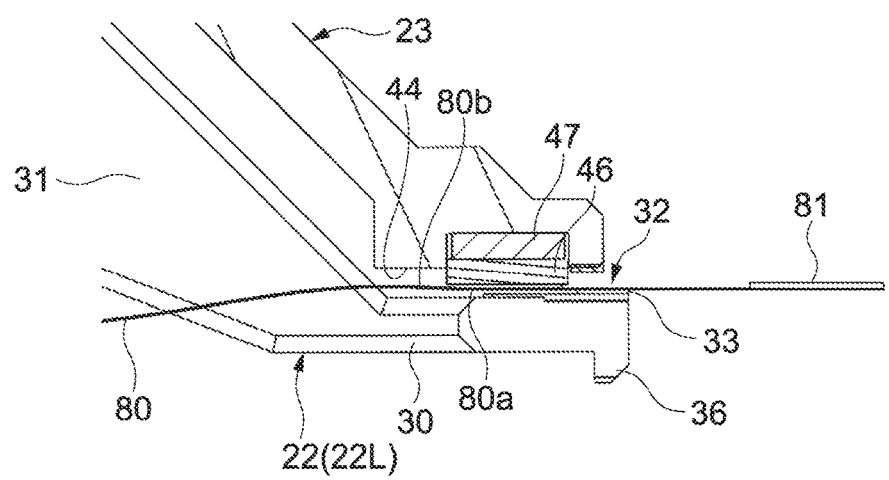

As shown in FIGS. 9C, 10A, and 10B, the C finger 23 is slid forward, and the second contact member 46 provided in the second surface portion 43 is brought into contact with an upper surface 80b of the FFC 80 (Step 104). At this time, a distance between the first and second surface portions 32 and 43 is controlled to be a first distance. The first distance is a distance at which the FFC 80 can be held in a state where the first contact member 46 protrudes from the reference surface 44. The lower surface 80a of the FFC 80 is brought into contact with the contact members 33 on the first surface portions 32.

It should be noted that a timing at which each of Steps 103 and 104 is started is not limited, and the two steps may be executed in parallel. Specifically, after the side portions 80c and 80d of the FFC 80 are held by the L and R fingers 22L and 22R, the first contact member 46 of the second surface portion 43 is brought into contact with the upper surface 80b of the FFC 80. As long as this order is kept, the timing at which each of Steps 103 and 104 is started may be set as appropriate.

Further, the posture of the hand portion 20 may be changed in parallel with the holding operation of Steps 103 and 104. For example, in accordance with a timing at which the holding operation of Steps 103 and 104 is completed, the extension direction of the tip end portions 30 and 42 is aligned in a sliding direction of the head portion 20 to be described next. In this embodiment, since the head portion 20 is slid in a substantially horizontal direction, the extension direction of the tip end portions 30 and 40 is changed from the vertical direction to the horizontal direction. It should be noted that the sliding direction is set in such a direction that an appropriate pre-tension can be applied to the FFC 80.

The first position on the FFC 80 is a position sufficiently more on the front side than a final position (second position) that is a holding position when attachment is performed. Typically, the first position is set near a root portion, that is, near the other fixed end portion.

The first position does not need to be set precisely on the FFC 80 and may be set roughly to some extent. Accordingly, in Steps 103 and 104, it becomes unnecessary to precisely perform positioning of the hand portion 20, and it becomes possible to reduce a control load and shorten an operation time. It should be noted that the position of the hand portion 20 corresponds to the holding position by the first and second surface portions 32 and 43.

The hand portion 20 is moved toward the reinforcement plate 81 at the tip end of the FFC 80 while maintaining the first holding force and is slid to a measurement position in front of the final position (Step 105). In this embodiment, the hand portion 20 is slid to a predetermined coordinate position using a coordinate system predetermined in the attachment apparatus 100 as a reference. The position on the FFC 80 corresponding to the coordinate position becomes the measurement position. For example, the measurement position is set within a range of 15 mm to 20 mm from the tip end portion of the FFC 80. It should be noted that a movement amount (sliding amount) from the first position may be set in advance.

By the second camera 27 shown in FIGS. 1 and 2, the FFC 80 held by the L and R fingers 22L and 22R and the C finger 23 is photographed, and a distance between the measurement position and the final position is measured (Step 106). On the basis of the measured distance, the hand portion 20 is slid to the final position while maintaining the first holding force (Step 107). In this way, by measuring the distance between the measurement position and the final position, it is possible to accurately move the hand portion 20 to the final position.

It should be noted that the final position may be set on the reinforcement plate 81 of the FFC 80 or may be set in front of the reinforcement plate 81. The final position may be set as appropriate in accordance with an insertion amount with respect to the connector portion 60. In this embodiment, for example, the final position is set at a position about 10 mm in front of the tip end portion of the FFC 80.

Figure 10C:
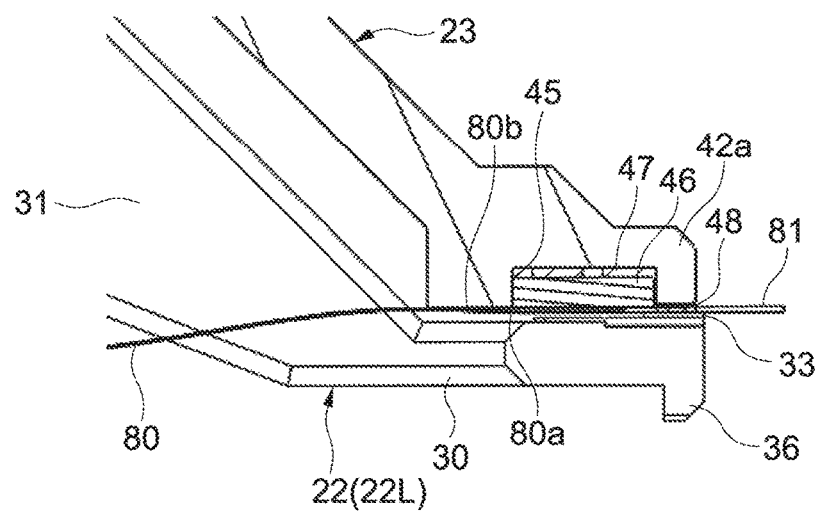

The C finger 23 is further slid at the final position, and the FFC 80 is held by the second holding force which is the holding force in the attachment mode (Step 108). As shown in FIG. 10C, the distance between the first and second surface portions 32 and 43 is set to be a second distance smaller than the distance shown in FIG. 10B (first distance). The second distance is a distance at which the first contact member 46 is accommodated in the concave portion 45, and the second contact member 48 provided in the protrusion portion 42a comes into contact with the upper surface 80b of the FFC 80.

As described above, in this embodiment, by making the distance between the first and second surface portions 32 and 43 small, it becomes possible to easily switch the contact member that comes into contact with the upper surface 80b of the FFC 80. Further, it also becomes possible to easily realize a switch from the first holding force to the second holding force.

The second camera 27 photographs the holding state at the final position. Accordingly, a final correction of the holding position is executed, and the insertion amount, insertion direction, and the like of the FFC 80 are corrected appropriately (Step 109). By setting the first and second cameras 26 and 27 integrally with the finger mechanism in the hand portion 20, it becomes possible to easily check the position of the connector portion 60 and the holding state of the FFC 80 with high accuracy. As a result, it becomes possible to improve attachment accuracy and reduce measurement variations and the like.

The X-axis direction shown in FIG. 2 and the like is aligned in the insertion direction of the FFC 80 with respect to the connector portion 60, that is, the vertical direction, and the reinforcement plate 81 of the FFC 80 is inserted into the insertion opening 62 of the connector portion 60 on the basis of the calculated correction amount (Step 110). Then, the connector lock, that is, the lock mechanism 61 of the connector portion 60 is put to the locked state (Step 111).

Figure 12A:
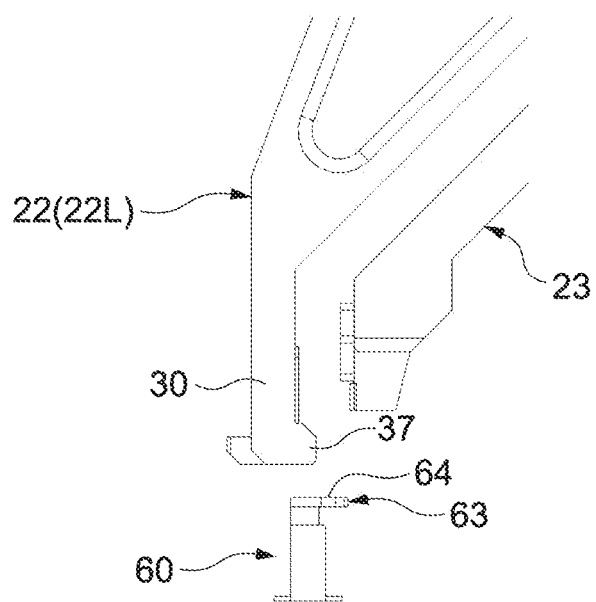
FIGS. 12A and 12B Schematic diagrams showing an operation example of the connector lock.
Figure 12B:
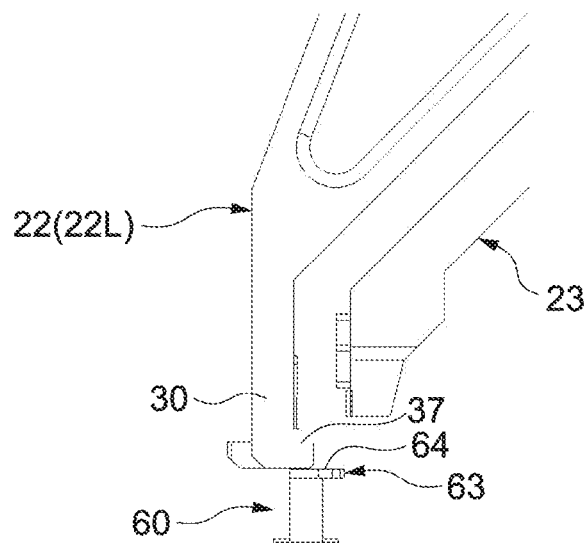

FIGS. 12A and 12B are schematic diagrams showing an operation example of the connector lock. It should be noted that in FIGS. 12A and 12B, the illustration of the FFC 80 is omitted. As shown in FIG. 12A, after the FFC 80 is inserted, the C finger 23 is slid to a rear side. As a result, holding of the FFC 80 inserted into the connector portion 60 is released. It should be noted that the L and R fingers 22L and 22R may be opened to release the holding, but in this case, each of the fingers is slid to such an extent that the pressing portion 37 formed at the tip end portion 30 of each finger is not deviated from a position above the lever portion 64 of the lock mechanism 63.

As shown in FIG. 12B, the lever portion 64 is pressed by the pressing portion 37 formed at the tip end portion 30 of each of the L and R fingers 22L and 22R. As a result, the lever portion 64 is moved in the insertion direction of the FFC 80, and the lock mechanism 63 is put to the locked state. As described above, in this embodiment, it is possible to automatically attach the FFC 80 to the connector portion 60 including the lock mechanism 63. Especially by using the protrusion portion 36 and the pressing portion 37, it is possible to easily make a switch between the locked state and the unlocked state.

Since the finger mechanism for holding the FFC 80 and the lock switch mechanism for operating the lock mechanism are formed integrally in the hand portion 20, a switch of hands or the like is unnecessary, and an assembly time can be shortened.

It should be noted that a portion having a special shape does not need to be newly formed as the pressing portion 37. For example, the lever portion 64 may be pressed by the tip end portions of the L and R fingers 22L and 22R. In this case, the tip end portions function as the pressing portion.

As described above, in the attachment apparatus 100 according to this embodiment, the FFC 80 is held while a movement thereof in the width direction is restricted at the first position. As a result, the FFC 80 can be appropriately held along the extension direction of the FFC 80. In other words, it is possible to prevent the FFC 80 from being deviated obliquely. Further, in a state where proper pre-tension is applied to the FFC 80 by the first holding force, the hand portion 20 is slid to the final position via the measurement position. As a result, it becomes possible to sufficiently reduce errors of a movement distance during sliding and sufficiently suppress an influence of an initial state (twist or deformation) of the FFC 80.

When the hand portion 20 moves to the final position, the FFC 80 is held by the second holding force larger than the first holding force. Since the FFC 80 is attached in a state where the second holding force is exerted, the reinforcement plate 81 can be inserted into the insertion opening 62 of the connector portion 60 while sufficiently preventing a positional deviation or the like from occurring. As a result, it becomes possible to automatically and accurately attach the FFC 80.

For example, in a chucking method of directly grabbing the reinforcement plate 81 of the FFC 80 or the like, a twist, deformation, or the like of the FFC 80 cannot be detected, so there is a high possibility that a trouble will occur. Even in the case of detecting a twist, deformation, or the like by image processing or the like, in order to eliminate a twist or the like, the FFC 80 needs to be released once, and the reinforcement plate 81 needs to be grabbed again after that. As a result, a tact time becomes extremely long.

In contrast, in the attachment apparatus 100, a position sufficiently more on the front side than the final position, for example, the vicinity of a root, is set as the first position, and the hand portion 20 is slid from the first position to the final position while holding the FFC 80. As a result, the problems described above can be solved, and the FFC 80 can be attached highly accurately.

Further, as shown in FIG. 3 and the like, the extension direction of the C finger 23 (X-axis direction) and the extension direction of the respective tip end portions 30 and 42 are set in mutually different directions. As a result, it becomes easy to slide the hand portion 20 while applying pre-tension to the FFC 80 so that the FFC 80 is not bent.

Figure 13A:
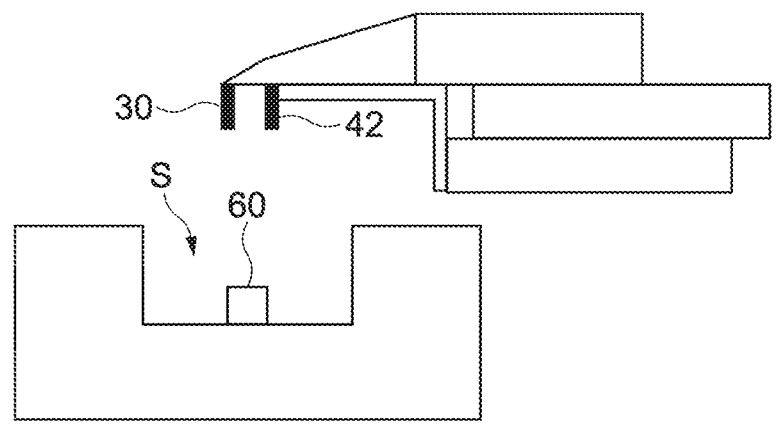
FIGS. 13A and 13B Diagrams for comparing angles of tip end portions of the respective fingers.
Figure 13B:
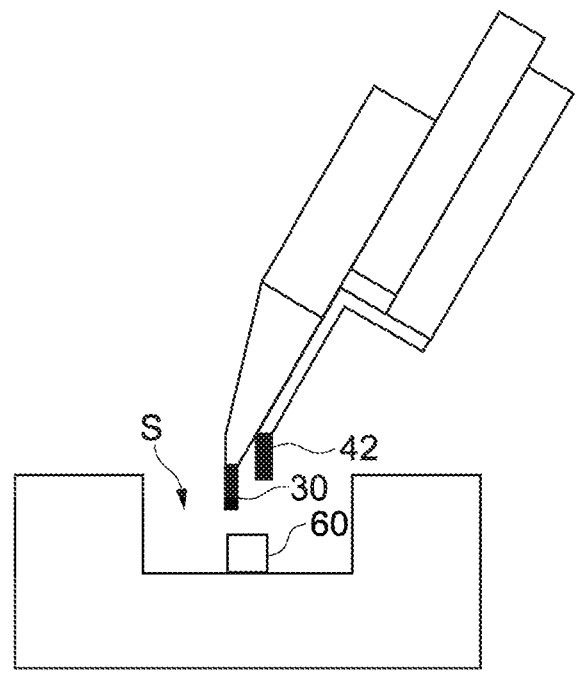

FIGS. 13A and 13B are diagrams comparing angles of the tip end portions 30 and 42. It should be noted that the angle θ between the virtual line T and the upper side 34 shown in FIG. 5 will be described as an angle θ between the tip end portions 30 and 42.

As shown in FIG. 13A, when the angle θ between the tip end portions 30 and 42 is set to approximately 90 degrees, the entire hand portion 20 needs to be tilted approximately 90 degrees at a time of pickup of the FFC 80 or insertion into the connector portion 60. Therefore, in a case where the connector portion 60 is formed in a narrow space S or the like, there is a possibility that execution of the task will become extremely difficult.

In contrast, by setting the angle θ between the tip end portions 30 and 42 within the range of 30 degrees or more and 80 degrees or less as in this embodiment, it becomes possible to insert the tip end portions 30 and 42 to the back of the narrow space S and execute the attachment task and the like without any problem. The angle θ between the tip end portions 30 and 42 only needs to be set as appropriate in accordance with the position of the connector portion 60, the space around the connector portion 60, and the like.

OTHER EMBODIMENTS

The present technology is not limited to the embodiment described above, and various other embodiments can be realized.

In the descriptions above, the finger mechanism including the 3 fingers, that is, the L and R fingers and the C finger, is used. Accordingly, the both side portions and surface portions of the FFC can be held easily. Further, it becomes possible to stably hold the FFC and thus improve attachment accuracy.

Further, since each of the L and R fingers can be moved along the width direction of the FFC, the both side portions of the FFC can be held easily. Also, even in a case where a plurality of types of FFCs having different widths (e.g., 6 pins, 9 pins, etc.) are used, the attachment task can be executed in accordance with the width of each FFC. Of course, this attachment apparatus is also applicable to a connector portion not including a lock mechanism.

Figure 14A:
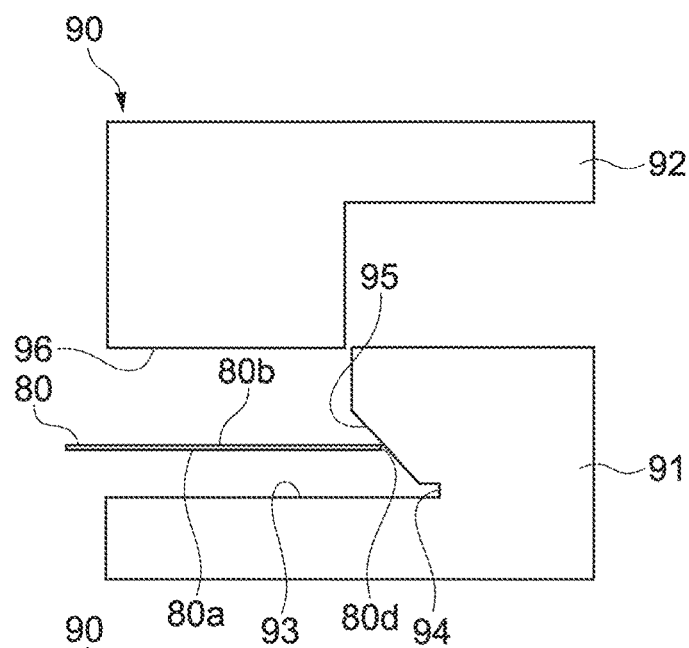
FIGS. 14A, 14B, and 14C Schematic diagrams showing another configuration example of a finger mechanism (holding portion and restriction portion).
Figure 14B:
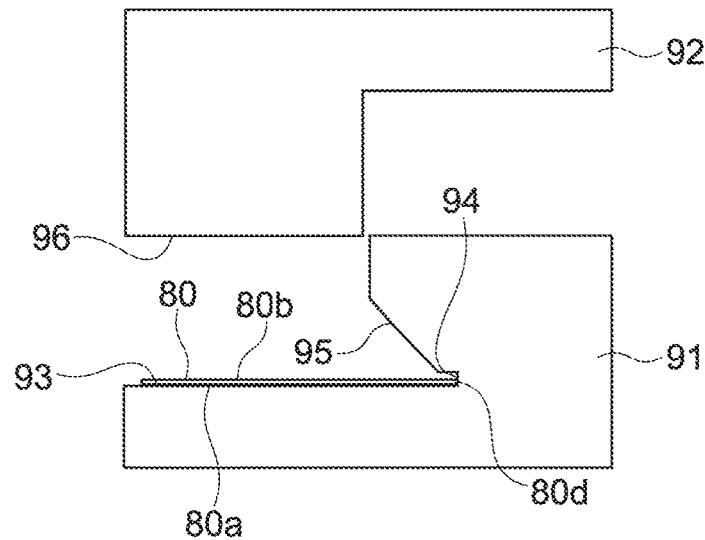
Figure 14C:
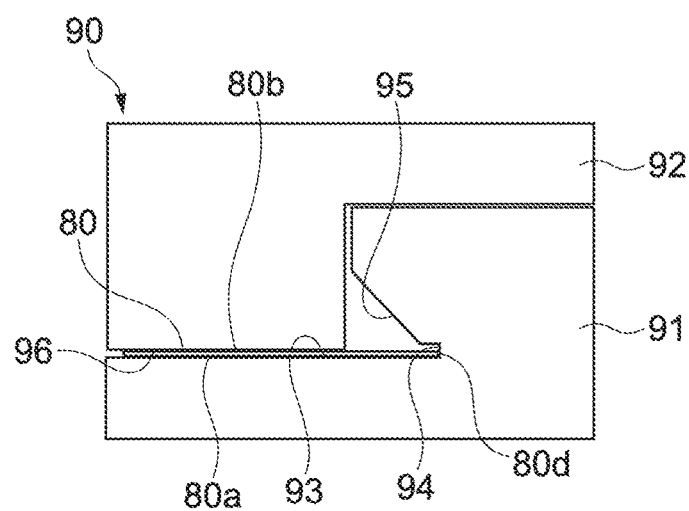

It should be noted that the configuration of the finger mechanism is not limited, and other configurations may be used as appropriate. For example, FIGS. 14A, 14B and 14C are schematic diagrams showing another configuration example of the finger mechanism (holding portion and restriction portion). This finger mechanism 90 includes a configuration that holds both surfaces 80a and 80b of the FFC 80 while restricting the movement in the width direction from only one side portion 80d of the FFC 80.

The finger mechanism 90 includes a lower finger 91 and an upper finger 92. The lower finger 91 has a substantially L-shaped cross section, and one of inner surfaces of the L shape becomes a first surface portion 93 that supports one surface (lower surface) 80a of the FFC 80. A guide groove 94 is formed at a root portion of the L-shaped cross section, and a tapered portion 95 is formed upwardly above the guide groove 94 (direction that sets apart from first surface portion 93). The upper finger 92 includes a second surface portion 96 capable of holding the other surface (upper surface) 80b of the FFC 80 at a position opposing the first surface portion 93.

As shown in FIG. 14A, when holding the FFC 80, the lower finger 91 is moved toward the FFC 80 so that the tapered portion 95 comes into contact with the side portion 80d of the FFC 80. As shown in FIG. 14B, the side portion 80d of the FFC 80 is guided to the guide groove 94 by the tapered portion 95, and a movement in the width direction is restricted by the guide groove 94. The upper finger 92 is moved downward, and the lower surface 80a and upper surface 80b of the FFC 80 are held by the first surface portion 93 and the second surface portion 96. Also with such a configuration, it becomes possible to automatically and accurately attach the FFC 80.

As another embodiment, only one of both surfaces of the FFC may be held. For example, an air suction hole may be formed at a tip end of a finger that holds either one of the surfaces of the FFC, and the FFC may be held by vacuum suction. Even in this case, by controlling a suction pressure (negative pressure), it is possible to appropriately switch the first holding force in the slide mode and the second holding force in the attachment mode. Since the number of fingers can be reduced, miniaturization of the apparatus also becomes possible.

The configuration of the lock mechanism is also not limited. For example, the locked state and the unlocked state may be switched by rotating the lever portion. Even in this case, it is only necessary to form a lock switch portion at a tip end portion of the finger mechanism and operate the lever portion.

At least two of the feature portions according to the present technology described above can be combined. In other words, various feature portions described in the respective embodiments may be arbitrarily combined without distinguishing the embodiments from one another. Moreover, the various effects described above are mere examples and should not be limited thereto, and other effects may also be exerted.

It should be noted that the present technology can also take the following configurations.

(1) An attachment apparatus, including:
a hand portion including a restriction portion that restricts a movement of a flat cable in a width direction and a holding portion that holds at least one of both surfaces of the flat cable; and
a control unit that causes the flat cable to be held by a first holding force while restricting the movement in the width direction at a first position on the flat cable, causes the hand portion to move to a second position on the flat cable while maintaining the first holding force, and causes the flat cable to be held at the second position by a second holding force to attach the flat cable.

(2) The attachment apparatus according to (1), in which the second holding force is larger than the first holding force.

(3) The attachment apparatus according to (1) or (2), in which
the restriction portion includes a pair of fingers that nips the flat cable in the width direction, and
the holding portion includes a first surface portion that is provided at a tip end portion of each of the pair of fingers and holds one of the surfaces of the flat cable, and a holding finger including a second surface portion that holds the other one of the surfaces of the flat cable at a position opposing the first surface portion.

(4) The attachment apparatus according to (3), in which
the restriction portion includes a first movement mechanism that moves at least one of the pair of fingers in the width direction, and
the holding portion includes a second movement mechanism that moves the holding finger in a direction in which the second surface portion comes into contact with the first surface portion.

(5) The attachment apparatus according to (3) or (4), in which
the control unit causes each of the pair of fingers to move toward the flat cable such that the first surface portion opposes the one of the surfaces of the flat cable, and causes the holding finger to move such that the flat cable is sandwiched by the first surface portion and the second surface portion.

(6) The attachment apparatus according to any one of (3) to (5), in which
the control unit sets a distance between the first surface portion and the second surface portion at the first position as a first distance, and sets a distance between the first surface portion and the second surface portion at the second position as a second distance smaller than the first distance.

(7) The attachment apparatus according to any one of (3) to (6), in which
the second surface portion includes a reference surface, a concave portion formed on the reference surface, a first contact member that protrudes from the reference surface in the concave portion and is movable in the protrusion direction, and an elastic member that supports the first contact member in the concave portion, and
the control unit causes the first contact member that protrudes from the reference surface at the first position to come into contact with the other one of the surfaces of the flat cable.

(8) The attachment apparatus according to (7), in which
the second surface portion includes a second contact member provided on the reference surface, and
the control unit causes the second contact member to come into contact with the other one of the surfaces by causing the holding finger to move such that the first contact member that is in contact with the other one of the surfaces is accommodated in the concave portion at the second position.

(9) The attachment apparatus according to (7) or (8), in which
the first contact member is formed of polycarbonate,
the elastic member is formed of urethane foam, and
the second contact member is formed of chloroprene rubber.

(10) The attachment apparatus according to any one of (3) to (9), in which
at least one of the pair of fingers includes a lock switch portion that switches a lock mechanism of a connector portion to which the flat cable is to be attached between a locked state and an unlocked state.

(11) The attachment apparatus according to (10), in which
the lock mechanism includes a lever portion that is movable in a direction in which the flat cable is inserted into the connector portion and makes a switch between the locked state and the unlocked state when a position thereof in the insertion direction is switched,
the lock switch portion includes a protrusion portion and a pressing portion, and
the control unit sets the unlocked state by moving the lever portion in a direction opposite to the insertion direction of the flat cable by the protrusion portion, and sets the locked state by moving the movement portion in the insertion direction of the flat cable by the pressing portion in a state where holding of the flat cable inserted into the connector portion is released.

(12) The attachment apparatus according to any one of (1) to (11), further including
an image pickup apparatus that photographs the flat cable held by the holding portion at the second position.

(13) The attachment apparatus according to any one of (4) to (12), in which
each of the pair of fingers includes a base portion provided along a movement direction of the holding finger and the tip end portion that is coupled to the base portion and extends in a direction different from the movement direction of the holding finger, and the control unit causes the flat cable to be sandwiched by the base portions in a state where an extension direction of the tip end portion is substantially the same as an extension direction of the flat cable.

(14) The attachment apparatus according to (13), in which
the base portion includes a tilted portion that extends along the movement direction of the holding finger, and
the tip end portion extends in a direction in which the first surface portion approaches the tilted portion.

(15) The attachment apparatus according to (14), in which
an angle formed between a virtual line that extends from a coupling portion between the tip end portion and the base portion along the extension direction of the tip end portion toward a side opposite to the tip end portion and the tilted portion is 30 degrees or more and 80 degrees or less.

(16) The attachment apparatus according to any one of (1) to (15), in which
the holding portion includes a suction portion that sucks at least one of the surfaces of the flat cable.

REFERENCE SIGNS LIST

S virtual line
20 hand portion (hand mechanism)
22 pair of fingers
22L L finger
22R R finger
23 C finger
24 hand actuator
25 slide actuator
26 first camera
27 second camera
30 tip end portion of L and R fingers
31 base portion
32 first surface portion
34 upper side
35 coupling portion
36 protrusion portion
37 pressing portion
42 tip end portion of C finger
43 second surface portion
44 reference surface
45 concave portion
46 first contact member
47 elastic member
48 second contact member
60 connector portion
63 lock mechanism
64 lever portion
70 controller
80 FFC
80a lower surface of FFC
80b upper surface of FFC
80c, 80d both side portions of FFC
90 finger mechanism
100 attachment apparatus

The invention claimed is:
1. An attachment apparatus, comprising:
a hand portion including:
a restriction portion configured to restrict a movement of a flat cable in a width direction; and
a holding portion configured to hold at least one of both surfaces of the flat cable; and a control unit configured to:
hold the flat cable at a first position on the flat cable based on a first holding force while restricting the movement in the width direction;
move the hand portion to a second position on the flat cable while maintaining the first holding force; and
hold the flat cable at the second position based on a second holding force to attach the flat cable.

2. The attachment apparatus according to claim 1, wherein the second holding force is larger than the first holding force.

3. The attachment apparatus according to claim 1, wherein
the restriction portion includes a pair of fingers configured to nip the flat cable in the width direction, and
the holding portion includes:
a first surface portion provided at a tip end portion of each finger of the pair of fingers, wherein the first surface portion is configured to hold a first surface of the flat cable; and
a holding finger including a second surface portion configured to hold a second surface of the flat cable at a position opposing the first surface portion.

4. The attachment apparatus according to claim 3, wherein
the restriction portion includes a first movement mechanism configured to move at least one finger of the pair of fingers in the width direction, and
the holding portion includes a second movement mechanism configured to move the holding finger in a direction in which the second surface portion comes into contact with the first surface portion.

5. The attachment apparatus according to claim 4, wherein
each finger of the pair of fingers includes a base portion along a movement direction of the holding finger,
the tip end portion is coupled to the base portion and extends in a direction different from the movement direction of the holding finger, and
the control unit is further configured to cause the flat cable to be sandwiched by base portions of fingers of the pair of fingers in a state where an extension direction of the tip end portion is substantially the same as an extension direction of the flat cable.

6. The attachment apparatus according to claim 5, wherein
the base portion includes a tilted portion that extends along the movement direction of the holding finger, and
the tip end portion extends in a direction in which the first surface portion approaches the tilted portion.

7. The attachment apparatus according to claim 6, wherein
an angle formed between a virtual line and the tilted portion is 30 degrees or more and 80 degrees or less, and
the virtual line extends from a coupling portion between the tip end portion and the base portion along the extension direction of the tip end portion toward a side opposite to the tip end portion.

8. The attachment apparatus according to claim 3, wherein the control unit is further configured to:
move each finger of the pair of fingers toward the flat cable such that the first surface portion opposes the first surface of the flat cable; and
move the holding finger such that the flat cable is sandwiched by the first surface portion and the second surface portion.

9. The attachment apparatus according to claim 3, wherein the control unit is further configured to:
set a distance between the first surface portion and the second surface portion at the first position as a first distance; and
set a distance between the first surface portion and the second surface portion at the second position as a second distance, wherein the second distance is smaller than the first distance.

10. The attachment apparatus according to claim 3, wherein
the second surface portion includes:
a reference surface;
a concave portion on the reference surface;
a first contact member that protrudes from the reference surface in the concave portion, wherein the first contact member is movable in a protrusion direction; and
an elastic member configured to support the first contact member in the concave portion, and
the control unit is further configured to cause the first contact member that protrudes from the reference surface at the first position to come into contact with the second surface of the flat cable.

11. The attachment apparatus according to claim 10, wherein
the second surface portion includes a second contact member on the reference surface, and
the control unit is further configured to:
cause the holding finger to move such that the first contact member that is in contact with the second surface of the flat cable is accommodated in the concave portion at the second position; and
cause the second contact member to come into contact with the second surface of the flat cable based on the movement of the holding finger.

12. The attachment apparatus according to claim 11, wherein
the first contact member is of polycarbonate,
the elastic member is of urethane foam, and
the second contact member is of chloroprene rubber.

13. The attachment apparatus according to claim 3, wherein
at least one finger of the pair of fingers includes a lock switch portion configured to switch a lock mechanism of a connector portion to which the flat cable is to be attached, and
the lock mechanism is switched between a locked state and an unlocked state.

14. The attachment apparatus according to claim 13, wherein
the lock mechanism includes a lever portion configured to:
move in a direction in which the flat cable is inserted into the connector portion; and
make a switch between the locked state and the unlocked state based on a switch in the position of the lever portion in the direction in which the flat cable is inserted into the connector portion,
the lock switch portion includes a protrusion portion and a pressing portion, and
the control unit is further configured to:
set the unlocked state based on a movement of the lever portion in a direction opposite to the direction in which the flat cable is inserted into the connector portion, wherein the lever portion is moved by the protrusion portion; and
set the locked state based on a movement of the lever portion in the direction in which the flat cable is inserted into the connector portion, wherein
the lever portion is moved by the pressing portion, and
the lever portion is moved in a state where holding of the flat cable inserted into the connector portion is released.

15. The attachment apparatus according to claim 1, further comprising an image pickup apparatus configured to photograph the flat cable held by the holding portion at the second position.

16. The attachment apparatus according to claim 1, wherein the holding portion includes a suction portion configured to suck at least one of the surfaces of the flat cable.

17. An attachment method, comprising:
holding, by a hand portion, a flat cable at a first position on the flat cable based on a first holding force while restricting a movement in a width direction, wherein the hand portion includes:
a restriction portion configured to restrict the movement of the flat cable in the width direction; and
a holding portion configured to hold at least one of both surfaces of the flat cable;
moving the hand portion to a second position on the flat cable while maintaining the first holding force;
holding the flat cable at the second position based on a second holding force and attaching the flat cable to a connector portion;
moving at least one finger of a pair of fingers of the restriction portion in the width direction, wherein the pair of fingers is configured to nip the flat cable in the width direction; and
moving a holding finger of the holding portion in a direction in which a first surface portion of the holding portion comes into contact with a second surface portion of the holding finger, wherein
the first surface portion is at a tip end portion of each finger of the pair of fingers and is configured to hold a first surface of the flat cable, and
the second surface portion is configured to hold a second surface of the flat cable at a position opposing the first surface portion.

18. A hand mechanism, comprising:
a restriction portion configured to restrict a movement of a flat cable in a width direction; and
a holding portion configured to hold at least one of both surfaces of the flat cable, wherein
the restriction portion includes:
a pair of fingers configured to nip the flat cable in the width direction; and
a first movement mechanism configured to move at least one finger of the pair of fingers in the width direction, and
the holding portion includes:
a first surface portion at a tip end portion of each finger of the pair of fingers, wherein the first surface portion is configured to hold a first surface of the flat cable;
a holding finger including a second surface portion configured to hold a second surface of the flat cable at a position opposing the first surface portion; and
a second movement mechanism configured to move the holding finger in a direction in which the second surface portion comes into contact with the first surface portion.

* * * * *